US012641343B2

(12) United States Patent　　　　　(10) Patent No.:　US 12,641,343 B2

Yamashita　　　　　　　　　　　　　(45) Date of Patent:　May 26, 2026

(54) IMAGE PROCESSING APPARATUS AND METHOD, IMAGE CAPTURING APPARATUS, AND STORAGE MEDIUM

(71) Applicant: CANON KABUSHIKI KAISHA, Tokyo (JP)

(72) Inventor: Yusuke Yamashita, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 46 days.

(21) Appl. No.: 18/927,259

(22) Filed: Oct. 25, 2024

(65) Prior Publication Data

US 2025/0142221 A1　　May 1, 2025

(30) Foreign Application Priority Data

Oct. 30, 2023　　(JP) ................................. 2023-185791

(51) Int. Cl.
| | |
|---|---|
| *H04N 23/741* | (2023.01) |
| *G06T 5/92* | (2024.01) |
| *H04N 23/71* | (2023.01) |
| *H04N 25/589* | (2023.01) |

(52) U.S. Cl.
CPC ............. *H04N 23/741* (2023.01); *G06T 5/92* (2024.01); *H04N 23/71* (2023.01); *H04N 25/589* (2023.01); *G06T 2207/20208* (2013.01)

(58) Field of Classification Search
CPC .... H04N 23/741; H04N 23/71; H04N 25/589; H04N 25/134; H04N 25/583; G06T 5/92; G06T 2207/20208
See application file for complete search history.

(56) References Cited

U.S. PATENT DOCUMENTS

| | | | | |
|---|---|---|---|---|
| 7,453,496 | B2 * | 11/2008 | Suzuki ................... | H04N 23/70 |
| | | | | 382/284 |
| 2010/0149384 | A1 * | 6/2010 | Iijima ................... | H04N 23/741 |
| | | | | 348/241 |
| 2013/0135486 | A1 | 5/2013 | Wan | |
| 2015/0199939 | A1 * | 7/2015 | Takahashi ................ | G09G 5/02 |
| | | | | 345/590 |
| 2018/0225813 | A1 * | 8/2018 | Yokota .................... | G06T 11/00 |
| 2025/0030959 | A1 * | 1/2025 | Shiotani ............... | H04N 25/778 |

* cited by examiner

*Primary Examiner* — Hung H Lam

(74) *Attorney, Agent, or Firm* — Canon U.S.A., Inc. IP Division

(57) ABSTRACT

A processing apparatus obtains pixel signals of a plurality of images by shooting a subject with different sensitivities by a sensor having a plurality of pixels; obtains a conversion ratio for converting the pixel signals of the plurality of images into pixel signals with a same sensitivity and a synthesis ratio for synthesizing the pixel signals of the plurality of images with the same sensitivity for each pixel; and performs dynamic range expansion synthesis for each pixel using the pixel signals of the plurality of images using the conversion ratio and the synthesis ratio. The synthesis ratio is obtained for each divided region obtained by dividing the plurality of pixels.

20 Claims, 9 Drawing Sheets

F I G. 5A
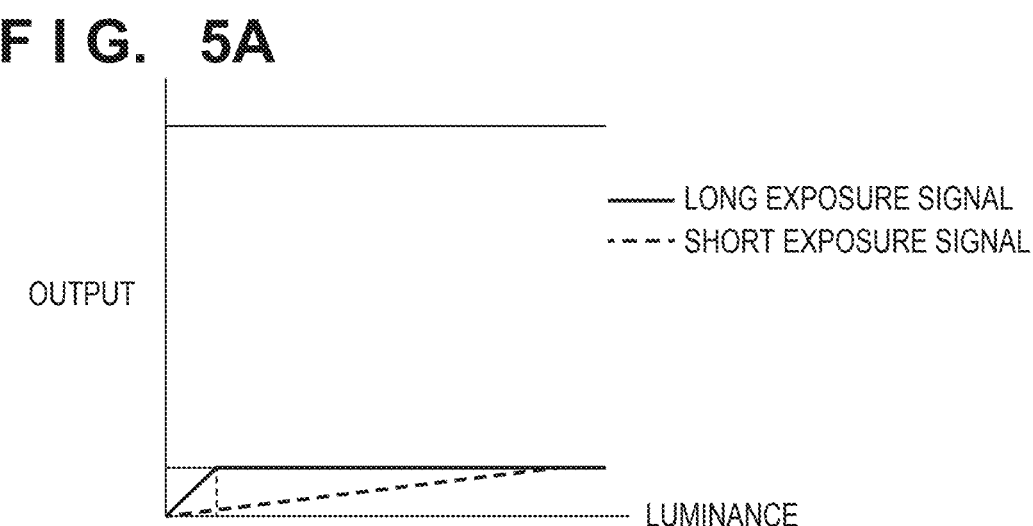
F I G. 5B
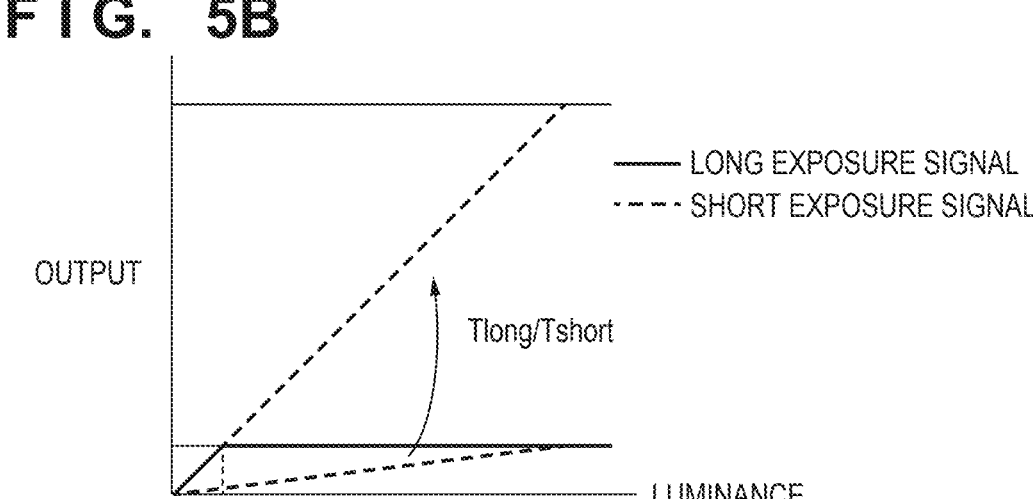
F I G. 5C
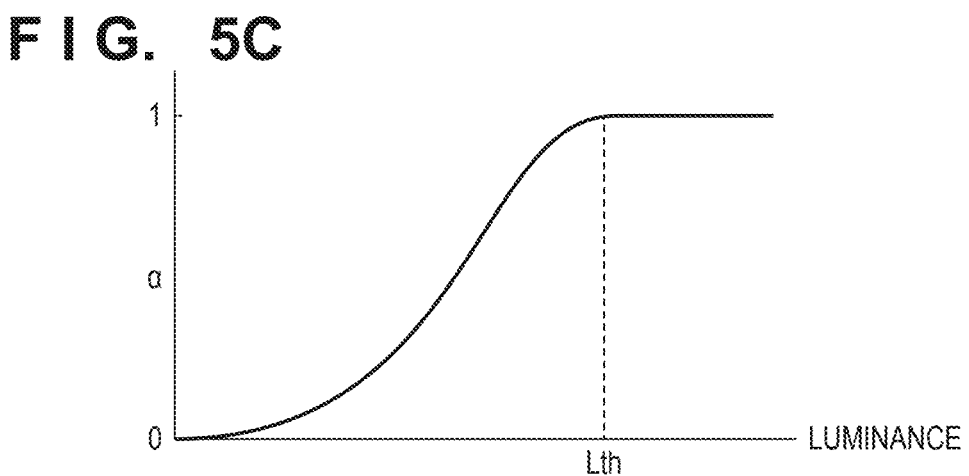

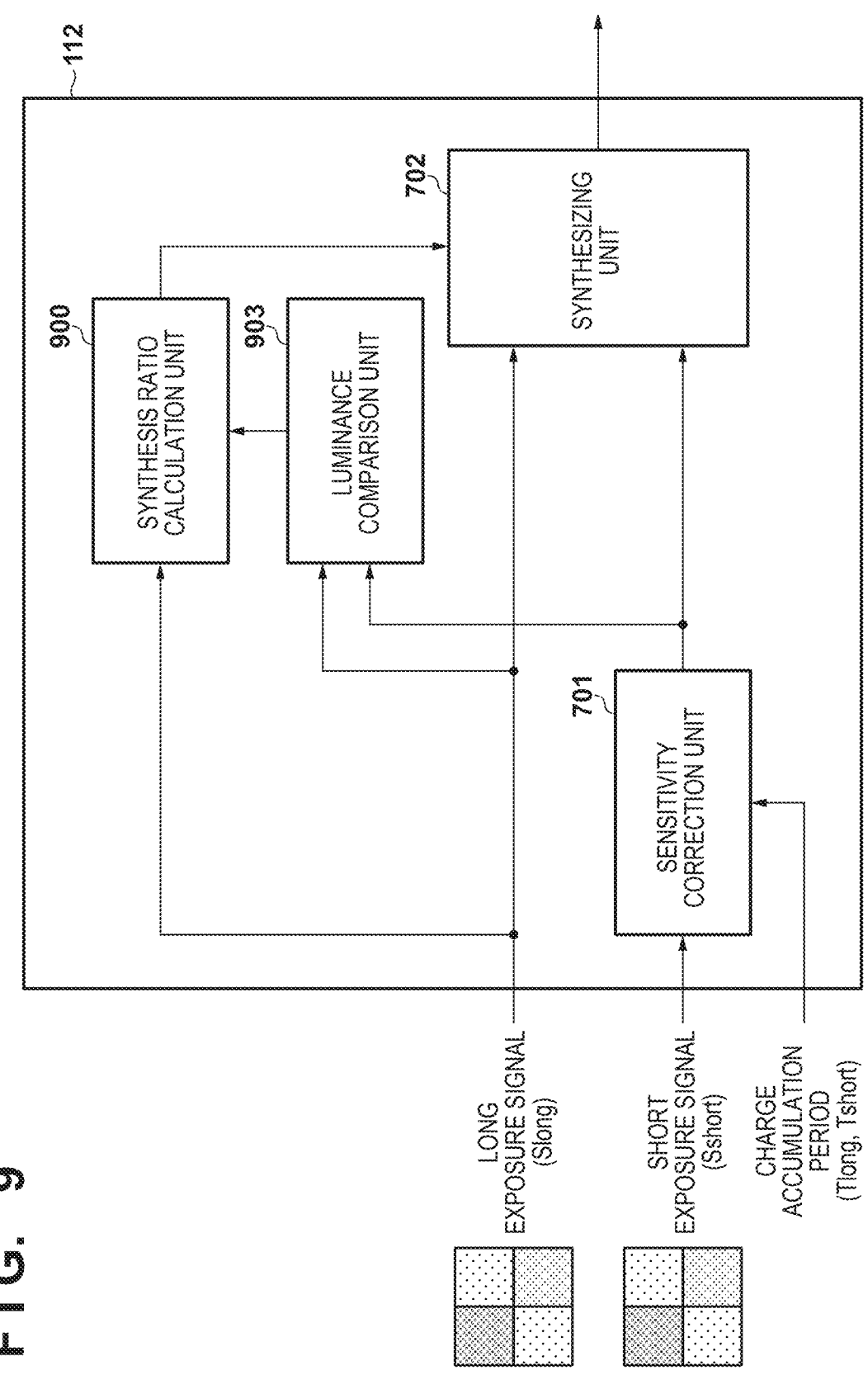
F I G. 9

F I G. 10

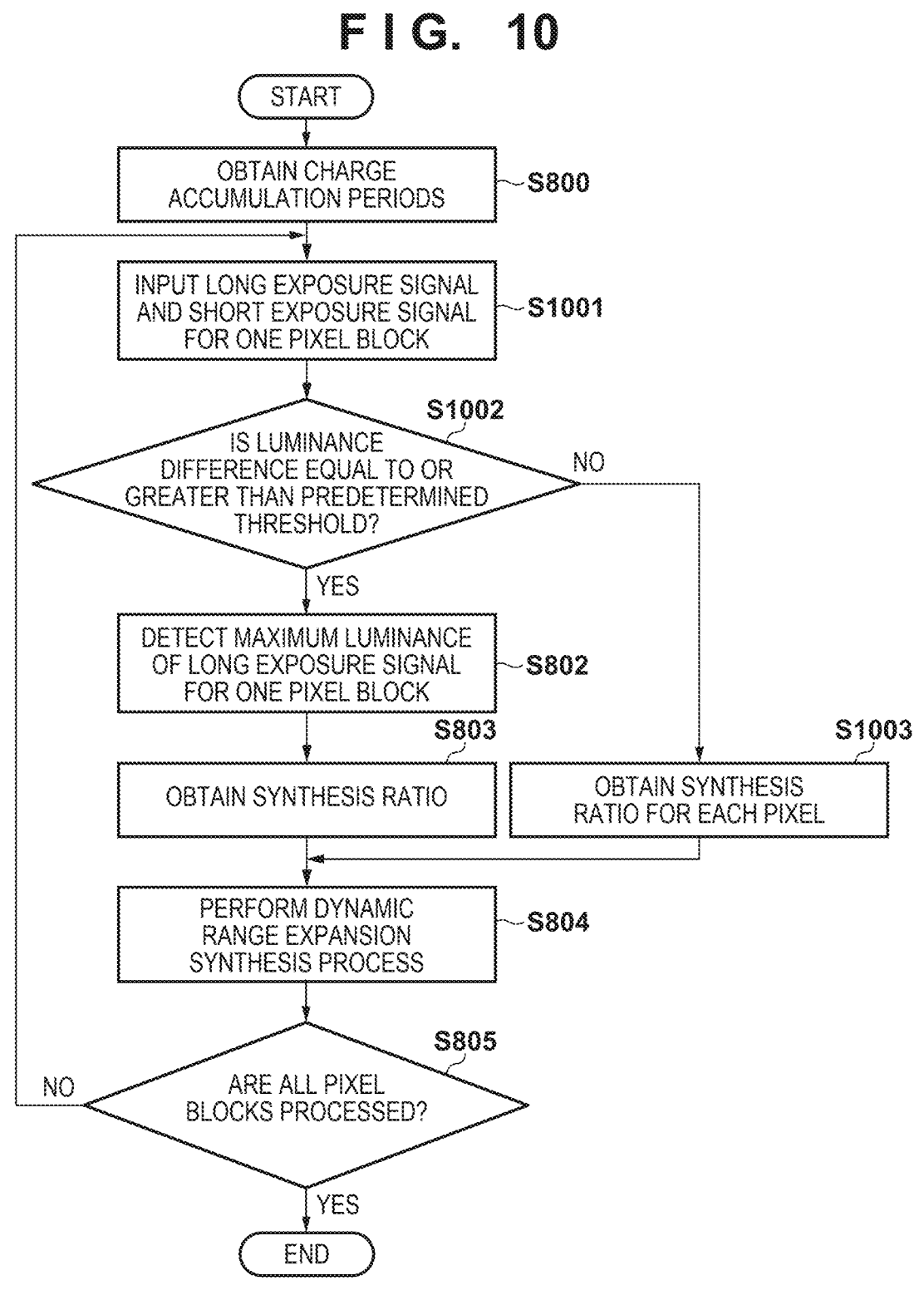

```
                    ┌─────────┐
                    │  START  │
                    └────┬────┘
                         │
        ┌────────────────▼────────────────┐
        │       OBTAIN CHARGE             │  S800
        │   ACCUMULATION PERIODS          │
        └────────────────┬────────────────┘
                         │
  ┌──────────────────────▼──────────────────────┐
  │        INPUT LONG EXPOSURE SIGNAL            │  S1001
  │      AND SHORT EXPOSURE SIGNAL               │
  │         FOR ONE PIXEL BLOCK                  │
  └──────────────────────┬──────────────────────┘
                         │           S1002
                    ╱────▼────╲
                 ╱   IS LUMINANCE   ╲
              ╱   DIFFERENCE EQUAL TO OR  ╲   NO
            ╱  GREATER THAN PREDETERMINED   ╲──────┐
             ╲        THRESHOLD?           ╱       │
                ╲                       ╱          │
                    ╲────┬────╲                    │
                         │ YES                     │
  ┌──────────────────────▼──────────┐              │
  │   DETECT MAXIMUM LUMINANCE       │  S802        │
  │  OF LONG EXPOSURE SIGNAL         │              │
  │     FOR ONE PIXEL BLOCK          │              │
  └──────────────────────┬──────────┘              │
                         │    S803                  │    S1003
  ┌──────────────────────▼──────────┐  ┌────────────▼────────────┐
  │    OBTAIN SYNTHESIS RATIO        │  │    OBTAIN SYNTHESIS     │
  │                                  │  │  RATIO FOR EACH PIXEL   │
  └──────────────────────┬──────────┘  └────────────┬────────────┘
                         │◄───────────────────────────┘
  ┌──────────────────────▼──────────┐
  │     PERFORM DYNAMIC              │  S804
  │   RANGE EXPANSION                │
  │   SYNTHESIS PROCESS              │
  └──────────────────────┬──────────┘
                         │          S805
                    ╱────▼────╲
          NO     ╱   ARE ALL PIXEL  ╲
      ┌────────╱  BLOCKS PROCESSED?  ╲
      │          ╲                  ╱
      │              ╲────┬────╲
      │                   │ YES
      │              ┌────▼────┐
      │              │   END   │
      │              └─────────┘
```

IMAGE PROCESSING APPARATUS AND METHOD, IMAGE CAPTURING APPARATUS, AND STORAGE MEDIUM

BACKGROUND

Technical Field

An aspect of the embodiments relates to an image processing apparatus and method, image capturing apparatus, and storage medium and, more particularly to, a dynamic range expansion synthesis technique.

Description of the Related Art

Among so-called CMOS image sensors, there is a GS sensor that has a global shutter (hereinafter referred to as "GS") function by having a memory section (charge holding section) in each pixel. The pixel of the GS sensor has a gate that transfers the signal charge accumulated in the photoelectric conversion section to the charge holding section. In the GS sensor, the charge is basically transferred from the photoelectric conversion section to the charge holding section simultaneously for all pixels, and the GS function is realized by making the timing of the start and end of charge accumulation in the photoelectric conversion section the same for all pixels. US-2013-0135486 discloses the configuration of a GS pixel having a plurality of charge holding sections for one photoelectric conversion section.

In addition, by configuring a plurality of charge storage units for each photoelectric conversion section and transferring charges to the charge storage units a plurality of times, respectively, during one frame period, it is possible to obtain a plurality of pixel signals corresponding to different charge accumulation periods from each pixel. Then, by synthesizing the plurality of obtained pixel signals for each pixel, an image with an expanded dynamic range can be obtained.

When generating a single image having an expanded dynamic range using a plurality of pixel signals obtained at different sensitivities by changing charge accumulation periods as in US-2013-0135486, or using different gains or ND filters, the luminance of the obtained pixel signals are typically corrected according to the difference in sensitivity before being combined.

However, due to the influence of the blinking cycle of the light source illuminating the subject such as an LED, the luminance ratios of the obtained pixel signals may not be the theoretical ratio according to the difference in sensitivity. If the luminance ratios of the obtained pixel signals deviate from the theoretical ratio, false colors will be generated when a plurality of pixel signals are combined due to the RGB ratios whose balance are lost.

SUMMARY

According to the disclosure, provided is an apparatus comprising at least one memory configured to store instructions; and at least one processor in communication with the at least one memory and configured to execute the instructions to: obtain pixel signals of a plurality of images by shooting a subject with different sensitivities by a sensor having a plurality of pixels; obtain a conversion ratio for converting the pixel signals of the plurality of images into pixel signals with a same sensitivity and a synthesis ratio for synthesizing the pixel signals of the plurality of images with the same sensitivity for each pixel; and perform dynamic range expansion synthesis for each pixel using the pixel signals of the plurality of images using the conversion ratio and the synthesis ratio, wherein the synthesis ratio is obtained for each divided region obtained by dividing the plurality of pixels.

According to the disclosure, provided is a capturing apparatus comprising: a sensor; and a processing apparatus comprising at least one memory configured to store instructions; and at least one processor in communication with the at least one memory and configured to execute the instructions to: obtain pixel signals of a plurality of images by shooting a subject with different sensitivities by a sensor having a plurality of pixels; obtain a conversion ratio for converting the pixel signals of the plurality of images into pixel signals with a same sensitivity and a synthesis ratio for synthesizing the pixel signals of the plurality of images with the same sensitivity for each pixel; and perform dynamic range expansion synthesis for each pixel using the pixel signals of the plurality of images using the conversion ratio and the synthesis ratio, wherein the synthesis ratio is obtained for each divided region obtained by dividing the plurality of pixels.

Further, according to the disclosure, provided is a method comprising: obtaining pixel signals of a plurality of images by shooting a subject with different sensitivities by a sensor having a plurality of pixels; obtaining a conversion ratio for converting the pixel signals of the plurality of images into pixel signals with a same sensitivity and a synthesis ratio for synthesizing the pixel signals of the plurality of images with the same sensitivity for each pixel; and perform dynamic range expansion synthesis for each pixel using the pixel signals of the plurality of images using the conversion ratio and the synthesis ratio, wherein the synthesis ratio is obtained for each divided region obtained by dividing the plurality of pixels.

Furthermore, according to the disclosure, provided is a method comprising: obtaining pixel signals of a plurality of images by shooting a subject with different sensitivities by a sensor having a plurality of pixels; obtaining a conversion ratio for converting the pixel signals of the plurality of images into pixel signals with a same sensitivity; determining, for each divided region, whether a luminance difference between a maximum luminance and a minimum luminance of luminances of the pixel signals whose sensitivities are matched using the conversion ratio is equal to or greater than a predetermined threshold, obtaining a synthesis ratio for synthesizing the pixel signals of the plurality of images with the same sensitivity for each pixel; and perform dynamic range expansion synthesis for each pixel using the pixel signals of the plurality of images using the conversion ratio and the synthesis ratio, wherein, in a case where the luminance difference is equal to or greater than the threshold, the synthesis ratio is obtained for the divided region, and in a case where the luminance difference is less than the threshold, the synthesis ration is obtained for each pixel.

Further, according to the disclosure, provided is a non-transitory computer-readable storage medium, the storage medium storing a program that is executable by the computer, wherein the program includes program code for causing the computer to obtain pixel signals of a plurality of images by shooting a subject with different sensitivities by a sensor having a plurality of pixels; obtain a conversion ratio for converting the pixel signals of the plurality of images into pixel signals with a same sensitivity and a synthesis ratio for synthesizing the pixel signals of the plurality of images with the same sensitivity for each pixel; and perform dynamic range expansion synthesis for each pixel using the pixel signals of the plurality of images using the conversion ratio and the synthesis ratio, wherein the synthesis ratio is obtained for each divided region obtained by dividing the plurality of pixels.

Further features of the disclosure will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the disclosure, and together with the description, serve to explain the principles of the disclosure.

FIGS. 5A to 5C are diagrams illustrating image synthesis processing for expanding a dynamic range according to the first embodiment.

FIG. 9 is a block diagram showing a configuration of an image synthesis unit according to a second embodiment.

FIG. 10 is a flowchart of image synthesis processing according to the second embodiment.

DESCRIPTION OF THE EMBODIMENTS

Figure 1:
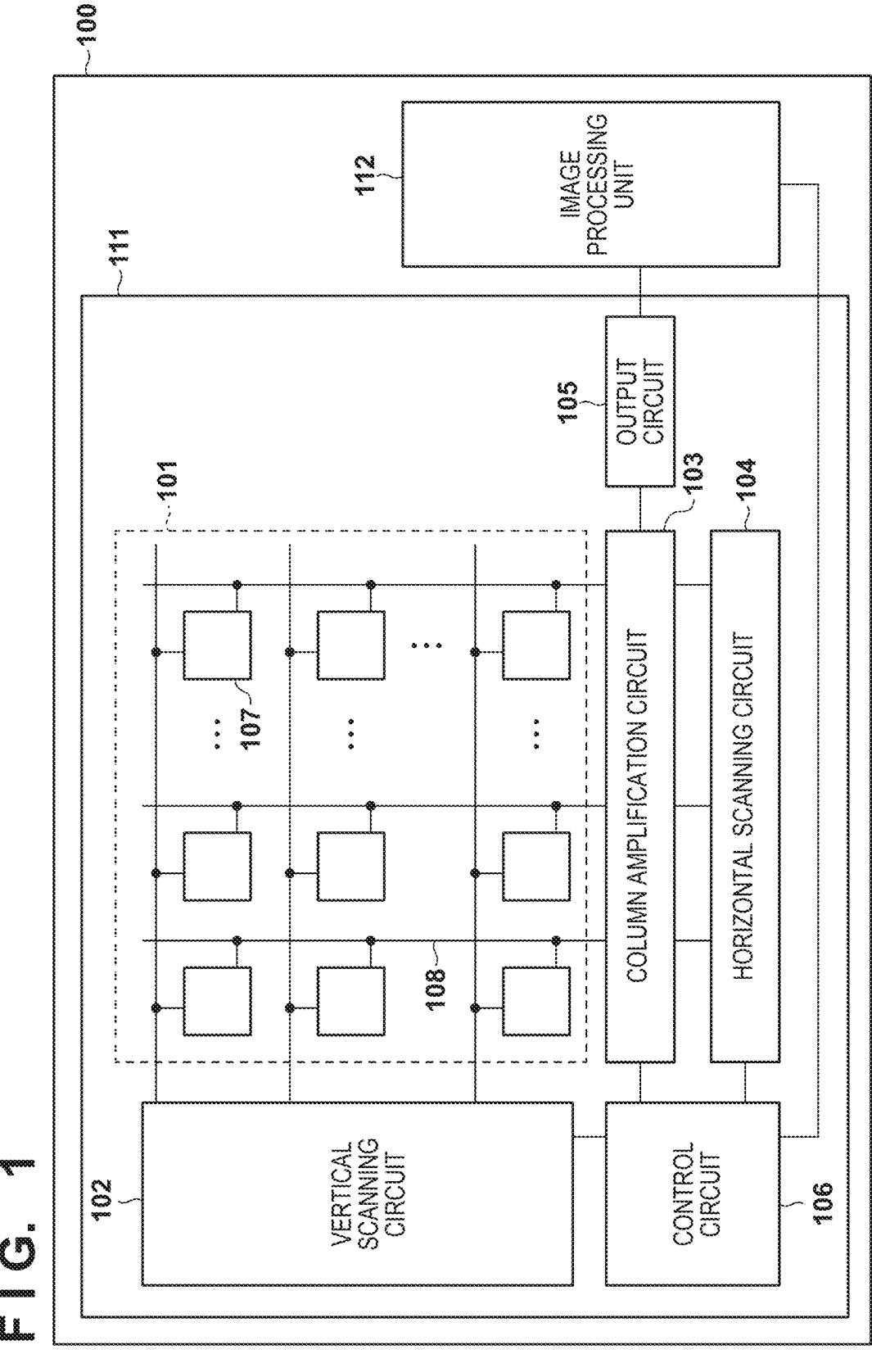
FIG. 1 is a block diagram showing a schematic configuration of an image capturing apparatus according to a first embodiment of the disclosure.

Hereinafter, embodiments will be described in detail with reference to the attached drawings. Note, the following embodiments are not intended to limit the scope of the claimed disclosure, and limitation is not made to a disclosure that requires a combination of all features described in the embodiments. Two or more of the multiple features described in the embodiments may be combined as appropriate. Furthermore, the same reference numerals are given to the same or similar configurations, and redundant description thereof is omitted.

First Embodiment

FIG. 1 is a block diagram showing a schematic configuration of an image capturing apparatus 100 according to a first embodiment. The image capturing apparatus 100 includes an image sensor (CMOS image sensor) 111 and an image processing unit 112. The image sensor 111 includes a pixel unit 101, a vertical scanning circuit 102, a column amplification circuit 103, a horizontal scanning circuit 104, an output circuit 105, and a control circuit 106.

The pixel unit 101 is a pixel array including a plurality of pixels 107 arranged two-dimensionally in a plurality of rows and a plurality of columns in a plan view of the substrate. The vertical scanning circuit 102 actuates the plurality of pixels 107 by supplying control signals to a plurality of transistors included in each of the pixels 107 and controlling on (conductive state) or off (non-conductive state) of these transistors. A signal line 108 is provided in each column of the pixel unit 101, and a signal from the pixel 107 is output to the signal line 108 of each column on a row-by-row basis.

The column amplification circuit 103 includes an amplifier for amplifying the pixel signal output to the signal line 108, and a processing unit for performing correlated double sampling on the signal output when the pixel 107 is reset and on the signal obtained after photoelectric conversion. The horizontal scanning circuit 104 supplies a control signal to switches of the column amplification circuit 103 and controls the switches to be turned on or off so that the pixel signal processed by the column amplification circuit 103 on a row-by-row basis is output to the output circuit 105.

The control circuit 106 controls the vertical scanning circuit 102, the column amplification circuit 103, and the horizontal scanning circuit 104. The control circuit 106 controls the vertical scanning circuit 102, thereby controlling the charge accumulation period of the pixels 107.

The output circuit 105 includes a buffer amplifier, a differential amplifier, etc., and outputs the pixel signal from the column amplification circuit 103 to the image processing unit 112 outside the image sensor 111. Note that the image sensor 111 may be provided with an AD conversion unit so that the image sensor 111 outputs a digital pixel signal.

Figure 2:
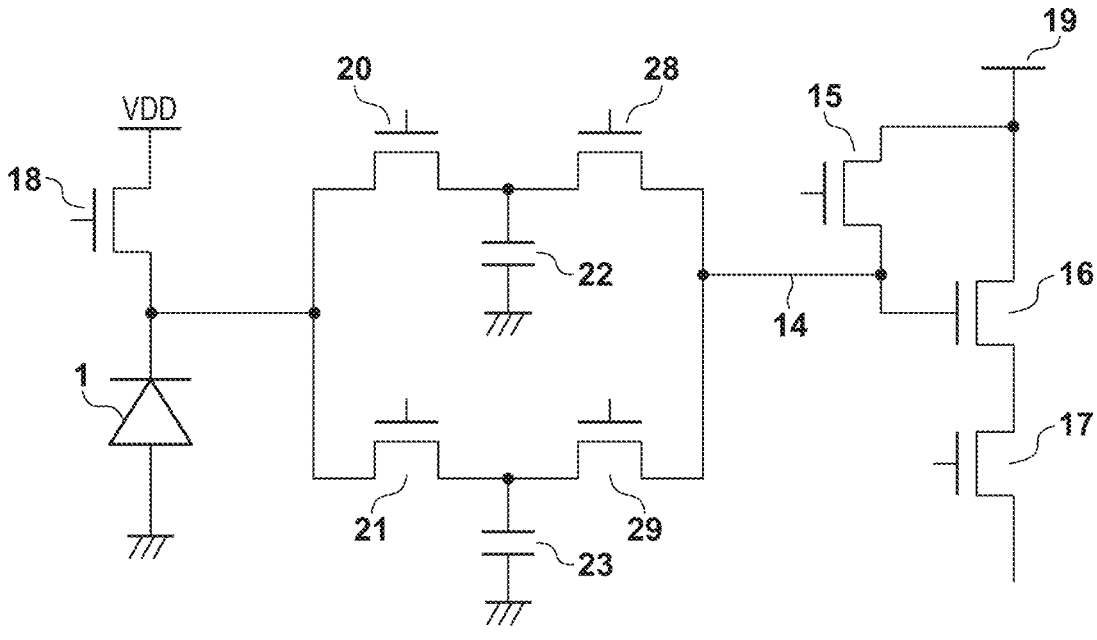
FIG. 2 is an equivalent circuit diagram showing a pixel configuration according to the first embodiment.

FIG. 2 is an equivalent circuit diagram illustrating the configuration of each pixel 107 in this embodiment.

In FIG. 2, a photodiode (PD) 1 shows an example of a photoelectric conversion section that generates charge corresponding to the amount of incident light. A charge transfer unit (GS_A) 20, a charge transfer unit (GS_B) 21, a charge transfer unit (TX_A) 28, a charge transfer unit (TX_B) 29, a selection unit (SEL) 17, and a reset unit (RES) 15 are each composed of, for example, MOS transistors.

When GS_A 20 is turned on, it transfers the charge generated in PD1 to a charge holding unit (MEM_A) 22. When GS_B 21 is turned on, it transfers the charge generated in PD1 to a charge holding unit (MEM_B) 23. MEM_A 22 and MEM_B 23 are configured to be able to hold the charge generated in PD1.

When TX_A 28 is turned on, it transfers the charge held in MEM_A 22 to the floating diffusion region (FD) 14. When TX_B 29 is turned on, it transfers the charge held in MEM_B 23 to the FD 14.

By turning on RES 15, FD 14 can be reset to the power supply voltage VDD. In addition, by turning on RES 15, TX_A 28, and TX_B 29 simultaneously, MEM_A 22 and MEM_B 23 can be reset to the power supply voltage VDD.

When SEL 17 is turned on, the corresponding pixel 107 is selected, and a voltage corresponding to the charge held in FD 14 amplified by a source follower (SF) 16 is output to a signal line 108 connected to the pixel 107.

A charge drain section (OFG) 18 is configured to drain unnecessary charge from PD 1, and may be implemented by, for example, a MOS transistor. In this case, a semiconductor region with the same polarity as the charge, which constitutes part of PD 1, serves as the source, and a semiconductor region (overflow drain (OFD) region) to which the power supply voltage VDD is supplied serves as the drain.

Next, the actuation method of the image sensor 111 in this embodiment will be described with reference to FIGS. 3 and 4.

Figure 3:
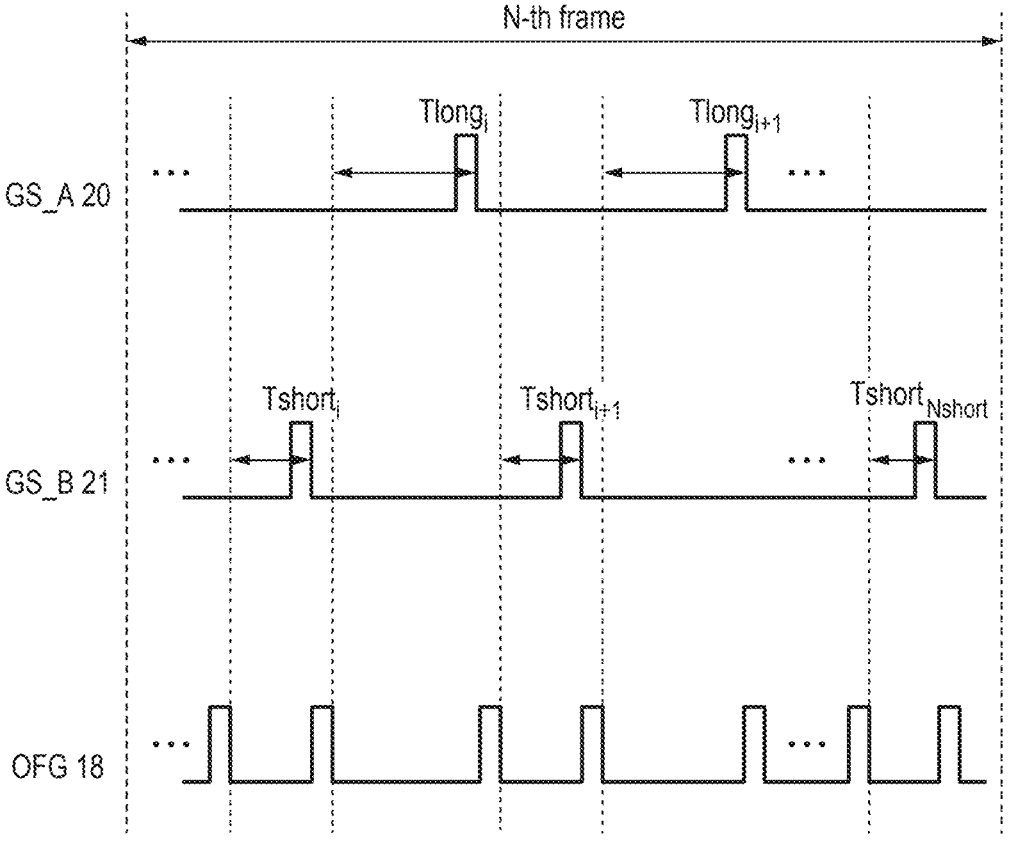
FIG. 3 is a timing chart showing charge accumulation control according to the first embodiment.
Figure 4:
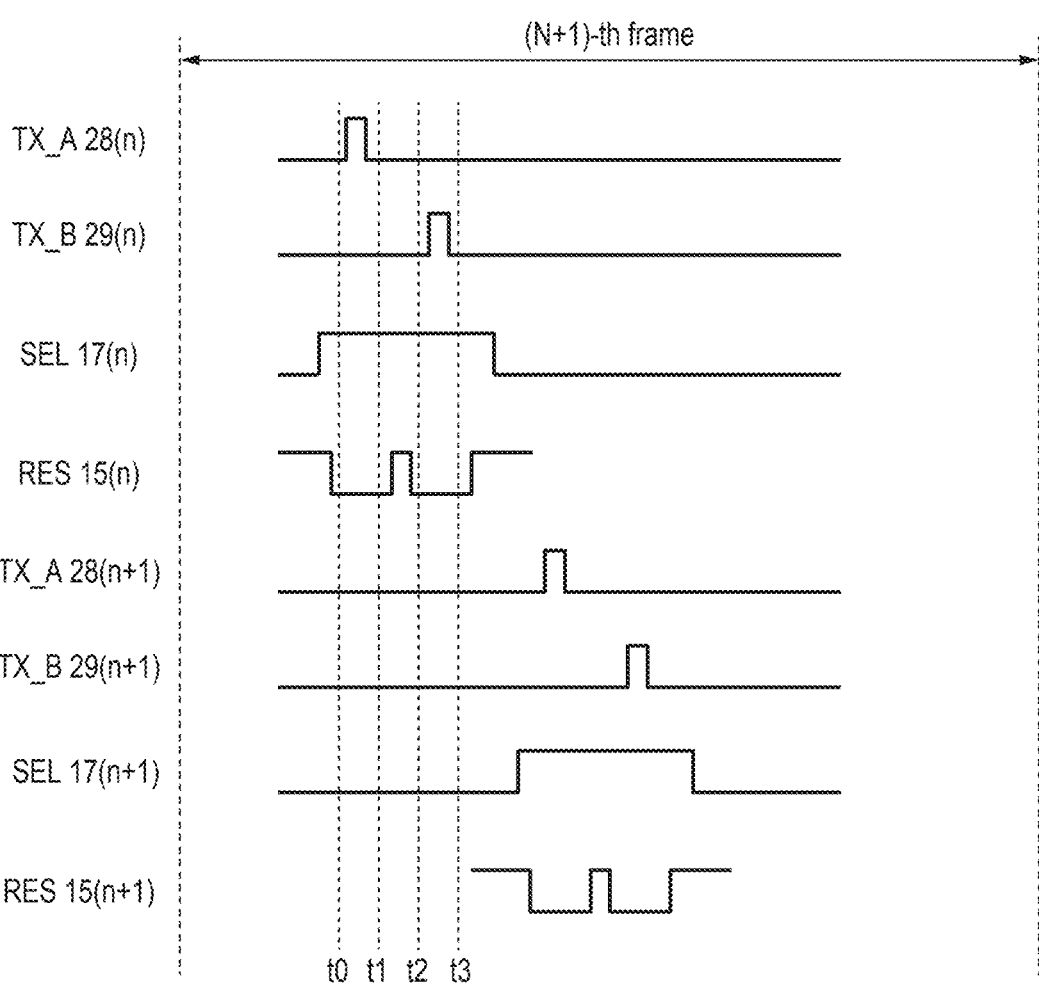
FIG. 4 is a timing chart showing signal readout control according to the first embodiment.

FIGS. 3 and 4 show the time sequence of the transition of actuation pulses supplied to the control electrodes of the respective transistors shown in FIG. 2, with FIG. 3 showing the actuation related to exposure and FIG. 4 showing the actuation related to readout. When the actuation pulses shown in FIGS. 3 and 4 are High, each transistor is turned on.

The subscripts (n, n+1) in FIG. 4 indicate pixel rows (nth row, n+1th row). Actuation of two rows will be described here, but actuation of three or more rows is performed by repeating the actuation pattern shown in FIG. 4.

Meanwhile, since the image sensor 111 is actuated by the GS method in this embodiment, the actuation timing related to exposure is the same for all pixels, regardless of row.

In FIG. 3, Tshort$_i$ indicates a charge accumulation period corresponding to the i-th charge transfer among the charge transfers repeated a plurality of times, for example Nshort times, in the N-th frame. Each charge accumulation period corresponds to the period from when the reset of PD 1 is released by turning on and off OFG 18, through a period when GS_B 21 is turned on and the charge generated in PD 1 is transferred to MEM_B 23, until when GS_B 21 is turned off. In the N-th frame, the total accumulation period Tshort corresponding to the charge accumulated in MEM_B 23 is the period obtained by adding up the charge accumulation periods Tshort$_i$ with i=1 to i=Nshort.

Further, Tlong$_i$ shown in FIG. 3 indicates a charge accumulation period corresponding to the i-th charge transfer among the charge transfers repeated a plurality of times, for example Nlong times, in the N-th frame. Each charge accumulation period corresponds to the period from when the reset of PD 1 is released by turning on and off OFG 18, through a period when GS_A 20 is turned on and the charge generated in PD 1 is transferred to MEM_A 22, until when GS_A 20 is turned off. In the N-th frame, the total accumulation period Tlong corresponding to the charge accumulated in MEM_A 22 is the period obtained by adding up the charge accumulation periods Tlong$_i$ with i=1 to i=Nlong.

Next, the signal readout control in the (N+1)-th frame will be described with reference to FIG. 4. Here, the electric charges transferred to MEM_A 22 and MEM_B 23 in the previous frame (N-th frame) are read out. The case where a signal is read out from the pixel 107 in the n-th row when signal is read out row by row will be described.

First, SEL 17(n) is turned on to read out a voltage corresponding to the charge in FD 14 of each pixel 107 in the nth row. Then, RES 15(n) is turned off to read out the reset level voltage VRES of FD 14 (time t0). Next, TX_A 28(n) is turned on to transfer the charge held in MEM_A 22 to FD 14 and read out the signal level VSIG of FD 14 (time t1). The difference between these two signal levels, |VSIG-VRES|, is a physical quantity proportional to the amount of charge held in MEM_A 22. Hereinafter, this |VSIG-VRES| is called the "long exposure signal Slong."

After that, RES 15(n) is turned on again to reset FD 14, and the reset level voltage VRES of FD 14 is read out (time t2). Next, TX_B 29(n) is turned on to transfer the charge held in MEM_B 23 to FD 14, and the signal level VSIG of FD 14 is read out (time t3). The difference between these two signal levels, |VSIG-VRES|, is a physical quantity proportional to the amount of charge held in MEM_B 23. Hereinafter, this |VSIG-VRES| is referred to as the "short exposure signal Sshort."

By repeating the above-described actuation row by row for all or a region where signals are to be acquired, the charges held in MEM_A 22 and MEM_B 23 of each pixel are read out as a long exposure signal Slong and a short exposure signal Sshort.

As described above, by configuring two charge accumulation portions for one PD 1 to hold the charges transferred thereto and controlling the charge accumulation periods of the charges transferred to each portion, it becomes possible to obtain an image with a high dynamic range by combining the obtained pixel signals.

FIGS. 5A to 5C are diagrams for explaining an overview of the dynamic range expansion synthesis process. FIG. 5A shows the outputs (signal values) obtained with respect to luminances in different charge accumulation periods, and FIG. 5B shows the output (signal value after correction) obtained with respect to luminance after the dynamic range is expanded.

As an example, the long exposure signal Slong obtained with a long charge accumulation period Tlong is basically used, and for bright and blown-out high-luminance portions, the short exposure signal Sshort obtained with a short charge accumulation period Tshort is corrected and used for synthesis. However, depending on the charge accumulation period, the short exposure signal Sshort obtained with the charge accumulation period Tshort may be used as the basis for synthesis, and the long exposure signal Slong obtained with the charge accumulation period Tlong may be corrected and used for synthesis for dark and low-luminance portions such as blocked-up shadows. Alternatively, the charge accumulation period Tlong and the short exposure signal Sshort may be corrected and synthesised to obtain a signal equivalent to intermediate sensitivity.

Specifically, if the signal level is lower than a predetermined level Lth, the long exposure signal Slong is used, and if the signal level is equal to or higher than the predetermined level Lth, the short exposure signal Sshort is corrected and used. In order to correct the time difference between the charge accumulation period Tlong and the charge accumulation period Tshort in this way, the signals are corrected and then synthesized using a conversion ratio R (=Tlong/Tshort), which is the ratio between the charge accumulation period Tlong and the charge accumulation period Tshort. For example, when the ratio between the charge accumulation period Tlong and the accumulation time Tshort is 4:1, the short exposure signal Sshort is multiplied by 4 and synthesized.

In addition, in the synthesis process, by using a blending (weighted addition) or the like, it is possible to smoothly connect images so that the switching portions are not noticeable. FIG. 5C is a diagram showing an example of a, with which the synthesis ratio is changed according to the brightness.

In this embodiment, α blending is performed. When the pixel signal after synthesis is designated as S$_{HDR}$, it can be expressed by the following formula (1).

$$S_{HDR}=(1-\alpha)\times Slong+\alpha\times R\times Sshort(\text{where } 0\leq\alpha\leq1) \quad (1)$$

The synthesis process has been described above, but as long as a plurality of images obtained with different sensitivities can be obtained for synthesis, the sensor does not necessarily have to have a GS function.

Figure 6:
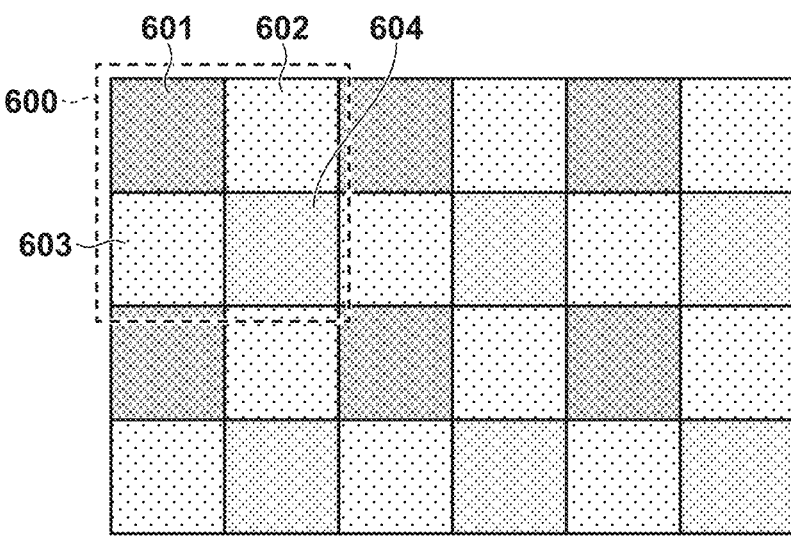
FIG. 6 is diagram showing an example of an arrangement of color filters according to the first embodiment.

FIG. 6 is a diagram showing an example of the arrangement of color filters provided on the pixel unit 101. Here, a Bayer array color filter is shown as an example. 601 indicates an R color filter, 602 and 603 indicate G color filters, and 604 indicates a B color filter. A short exposure signal Sshort and a long exposure signal Slong are output from each pixel 107 covered with a color filter. In this embodiment, a synthesis process is performed using the same synthesis ratio (α) for each pixel block 600, which is a set of four pixels covered with the color filters 601 to 604.

Figure 7:
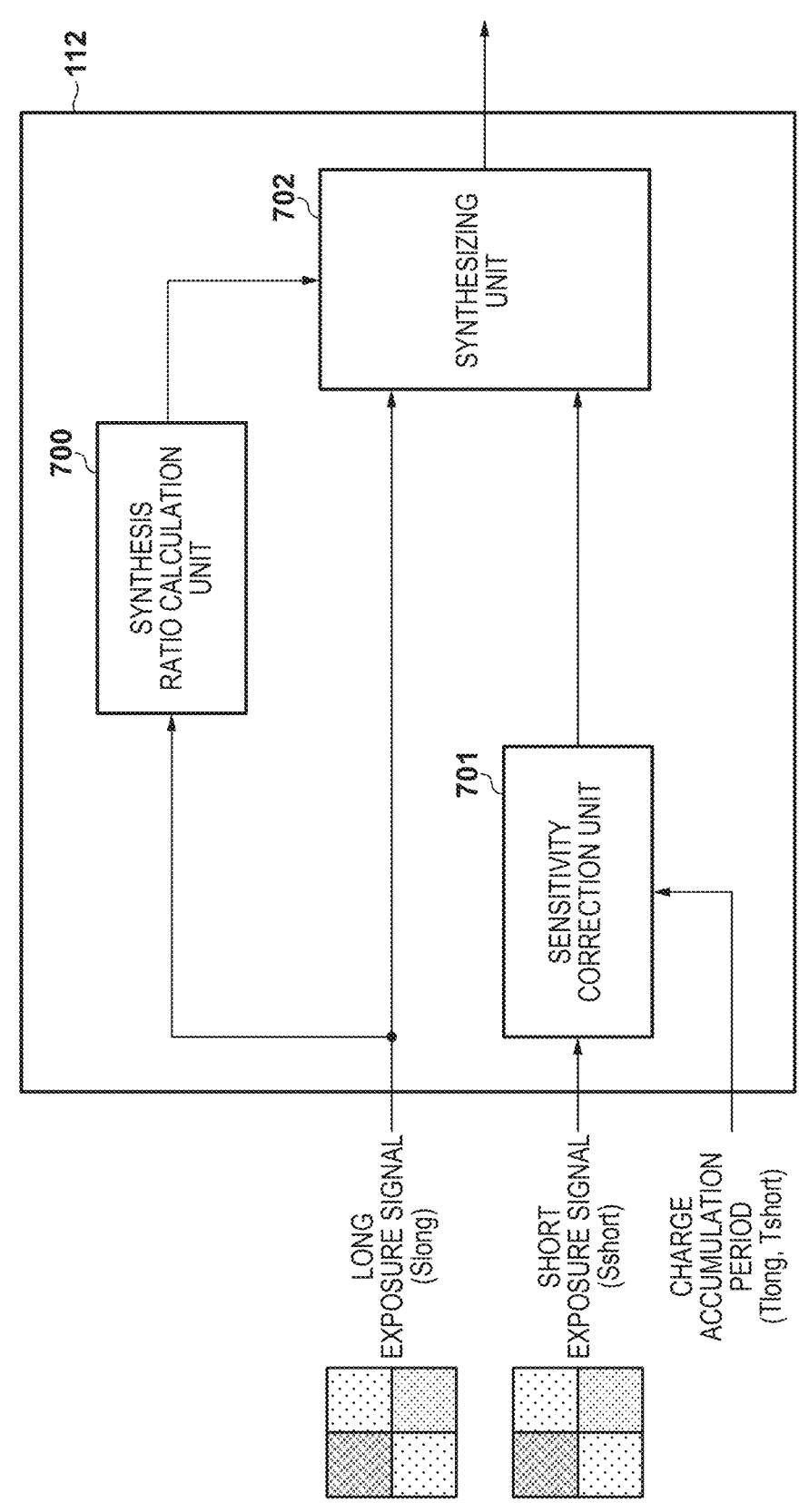
FIG. 7 is a block diagram showing a configuration of an image synthesis unit according to the first embodiment.

FIG. 7 is a block diagram showing the configuration of an image synthesis unit included in the image processing unit 112 for performing image synthesis processing in the first embodiment. As shown in FIG. 7, the image synthesis unit includes a synthesis ratio calculation unit 700, a sensitivity correction unit 701, and a synthesizing unit 702.

The synthesis ratio calculation unit 700 receives a long exposure signal Slong for each pixel block 600, and calculates a synthesis ratio based on the maximum luminance of the input long exposure signal Slong. Here, a shown in formula (1) is calculated. As a method of calculating a, a table as shown in FIG. 5C may be stored and a value corresponding to the maximum luminance may be read out, or an approximation formula for calculating a as a function with respect to the maximum luminance may be stored and a may be calculated. In addition, in a case of performing synthesis by correcting the long exposure signal Slong while using the short exposure signal Sshort as the basis for synthesis, the short exposure signal Sshort is input to the synthesis ratio calculation unit 700, and the synthesis ratio is calculated based on the minimum luminance of the luminance of the input short exposure signal Sshort.

The short exposure signal Sshort is input to the sensitivity correction unit 701 for each pixel block 600. Then, a sensitivity correction process is performed for each input short exposure signal Sshort to convert it into a signal with the same sensitivity as the long exposure signal Slong according to the conversion ratio R (=Tlong/Tshort) which is a ratio between a charge accumulation period Tlong and a charge accumulation period Tshort. The long exposure signal Slong for each pixel block 600 and a short exposure signal S'short (=Sshort×R) whose sensitivity is corrected by the sensitivity correction unit 701 are input to the synthesizing unit 702. Then, using the synthesis ratio α obtained by the synthesis ratio calculation unit 700 for each pixel block 600, a synthesis process is performed using the long exposure signal Slong and the sensitivity-corrected short exposure signal S'short for each pixel 107 included in each pixel block 600.

Figure 8:
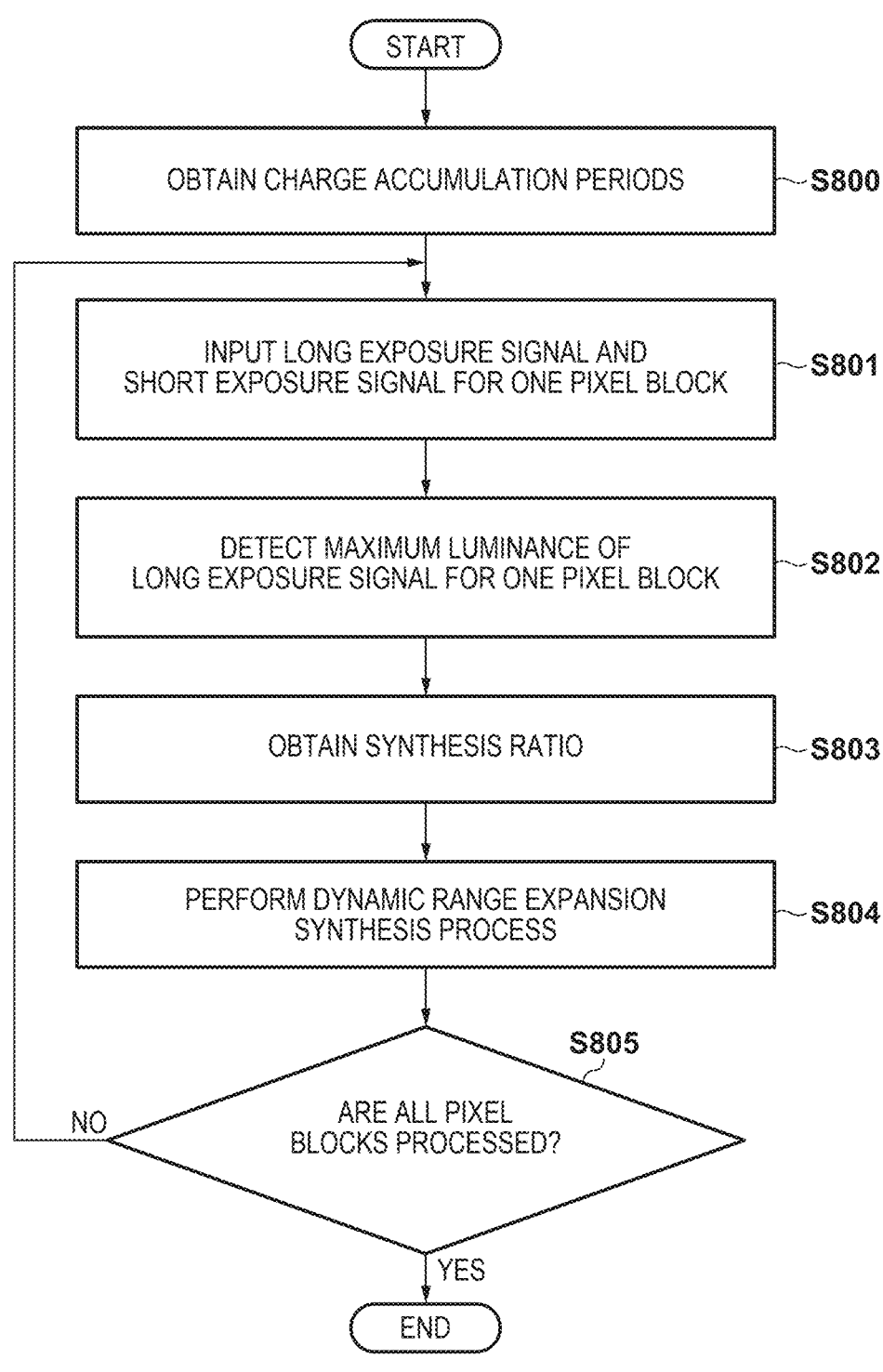
FIG. 8 is a flowchart of synthesis processing according to the first embodiment.

FIG. 8 is a flowchart of the synthesis processing in this embodiment described above.

First, in step S800, the sensitivity correction unit 701 obtains information related to sensitivity from the control circuit 106. Here, the charge accumulation period Tlong and the charge accumulation period Tshort are obtained. Note that the control circuit 106 may calculate a conversion ratio R (=Tlong/Tshort), which is the ratio between the charge accumulation period Tlong and the charge accumulation period Tshort, and the sensitivity correction unit 701 may obtain the ratio R.

Next, in step S801, a long exposure signal Slong and a short exposure signal Sshort are input from one pixel block 600, and the synthesis ratio calculation unit 700, the sensitivity correction unit 701, and the synthesizing unit 702 each detect the luminance of each input signal.

In step S802, the synthesis ratio calculation unit 700 detects the maximum luminance of the luminance of the input long exposure signal Slong for four pixels, and in the next step S803, the synthesis ratio calculation unit 700 calculates a synthesis ratio α according to the maximum luminance detected in step S802.

In step S804, dynamic range expansion synthesis process is performed according to the charge accumulation period Tlong and charge accumulation period Tshort acquired in step S800 and the synthesis ratio α calculated in step S803. Here, the sensitivity correction unit 701 corrects the luminance level of the short exposure signal Sshort based on the charge accumulation period Tlong and charge accumulation period Tshort, and then the synthesizing unit 702 weights and synthesizes the long exposure signal Slong and the corrected short exposure signal S'short using the synthesis ratio α. In this embodiment, the dynamic range expansion synthesis process is performed for each pixel included in the same pixel block 600 using the same synthesis ratio α.

In step S805, it is determined whether all pixel blocks 600 have been processed. If there is an unprocessed pixel block 600, the process returns to step S801 and the above processes are repeated. If all pixel blocks 600 have been processed, the synthesis processing ends.

As described above, according to the first embodiment, false colors can be suppressed by performing dynamic range expansion synthesis process using the same synthesis ratio for every four pixels covered by color filters that make up one pattern of the Bayer array.

Second Embodiment

Next, a second embodiment according to the present disclosure will be described.

Compared to the first embodiment, the second embodiment differs in the configuration of the image synthesis unit shown in FIG. 7. The other configurations, pixel actuation method, and basic dynamic range expansion synthesis process are the same as those described with reference to FIGS. 1 to 6, so the same reference numbers are used and descriptions thereof are omitted.

FIG. 9 is a block diagram illustrating the configuration of an image synthesis unit included in the image processing unit 112 for performing image synthesis processing in the second embodiment. A luminance comparison unit 903 is added to the configuration shown in FIG. 7, and a synthesis ratio calculation unit 900 calculates the synthesis ratio by further using the comparison result by the luminance comparison unit 903. Since the configuration other than these is the same as the configuration shown in FIG. 7, the same reference numbers are used and the description thereof is omitted.

The luminance comparison unit 903 receives the long exposure signal Slong and the short exposure signal S'short whose sensitivity is corrected by the sensitivity correction unit 901 for each pixel block 600. Then, the luminance difference between the maximum luminance and the minimum luminance of the input long exposure signal Slong and the short exposure signal S'short whose sensitivity is corrected is calculated. The synthesis ratio calculation unit 900 adaptively changes the method for calculating the synthesis ratio α using the luminance difference calculated by the luminance comparison unit 903. Specifically, when the luminance difference is equal to or greater than a predetermined threshold, the synthesis ratio α is calculated for the pixel block 600, and when the luminance difference is less than the predetermined threshold, the synthesis ratio α is calculated for each pixel.

FIG. 10 is a flowchart of the synthesis processing in the second embodiment. In the flowchart of FIG. 10, the same processes as those explained in FIG. 8 are given the same step numbers and the explanation thereof will be omitted.

In step S1001, as in the first embodiment, a long exposure signal Slong and a short exposure signal Sshort are input from one pixel block 600, and the synthesis ratio calculation unit 900, the luminance comparison unit 903, the sensitivity correction unit 701, and the synthesizing unit 702 each detect the luminance of each input signal.

Next, in step S1002, the luminance comparison unit 903 obtains the difference between the maximum luminance and the minimum luminance among the luminance of the short exposure signal S'short whose sensitivity is corrected by the sensitivity correction unit 701 and the luminance of the long exposure signal Slong. The synthesis ratio calculation unit 900 then judges whether the obtained luminance difference is equal to or greater than a predetermined threshold. If the luminance difference is equal to or greater than the predetermined threshold, the processes of steps S802 to S804 are performed.

On the other hand, if the luminance difference is less than the predetermined threshold in step S1002, the process proceeds to step S1003. In step S1003, the synthesis ratio calculation unit 900 calculates a synthesis ratio α for each pixel 107 included in the pixel block 600. Then, in step S804, dynamic range expansion synthesis process is performed for each pixel 107 using the synthesis ratio α calculated for each pixel 107 in step S1003.

As described above, according to the second embodiment, in a scene that is not affected by the blinking cycle, it is possible to calculate the synthesis ratio and perform synthesis for each pixel. This makes it possible to suppress false colors when there is an effect of the blinking cycle, and to improve the S/N ratio when there is no effect of the blinking cycle comparing to the first embodiment.

Other Embodiments

In the above embodiments, four pixels covered by R, G, B filters have been described as one unit of processing, but for example, the screen may be divided into a matrix of multiple pixels, and the processing of this embodiment may be performed on a divided area basis. The size and position of the multiple pixel area may also be changed for each frame.

Furthermore, in the above-described embodiments, the synthesis ratio is calculated based on the maximum luminance of the input signal, but the synthesis ratio may also be calculated based on the maximum luminance with taking into consideration a possibility that, for example, white balance gains are applied, etc., during the development process.

Furthermore, in the above embodiment, the case where the pixels are covered with primary color filters has been described, but it is also possible to use complementary color filters.

Furthermore, in the above embodiment, the case where two types of pixel signals obtained by different charge accumulation periods are synthesized has been described, but the method of changing the sensitivity is not limited to the method of using different accumulation periods, and for example, a gain value or the transmittance of a ND filter may be changed. In this case, the ratio between sensitivities such as between gain values or transmittances may be used as the conversion ratio R. In addition, two or more types of pixel signals (types of exposure conditions) may be used in the synthesis processing.

Furthermore, the disclosure may be applied to a system made up of a plurality of devices, or to an apparatus made up of a single device.

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-185791, filed Oct. 30, 2023 which is hereby incorporated by reference herein in its entirety.

What is claimed is:

1. A processing apparatus comprising at least one memory configured to store instructions; and at least one processor in communication with the at least one memory and configured to execute the instructions to:

obtain pixel signals of a plurality of images by shooting a subject with different sensitivities by a sensor having a plurality of pixels;

obtain a conversion ratio for converting the pixel signals of the plurality of images into pixel signals with a same sensitivity and a synthesis ratio for synthesizing the pixel signals of the plurality of images with the same sensitivity for each pixel; and perform dynamic range expansion synthesis for each pixel using the pixel signals of the plurality of images using the conversion ratio and the synthesis ratio, wherein the synthesis ratio is obtained for each divided region obtained by dividing the plurality of pixels.

2. The processing apparatus according to claim 1, wherein the divided region is a region corresponding to a repetition unit of an arrangement of color filters that covers the sensor.

3. The processing apparatus according to claim 2, wherein the color filters forms a Bayer color filter.

4. The processing apparatus according to claim 1, wherein the synthesis ratio is obtained based on a maximum luminance of luminances of the pixel signals of the plurality of images for each divided region.

5. The processing apparatus according to claim 4, wherein the conversion ratio for making sensitivities of the pixel signals of the plurality of images match to a highest sensitivity is obtained.

6. The processing apparatus according to claim 1, wherein the synthesis ratio is obtained based on a minimum luminance of luminances of the pixel signals of the plurality of images for each divided region.

7. The processing apparatus according to claim 6, wherein the conversion ratio for making sensitivities of the pixel signals of the plurality of images match to a lowest sensitivity is obtained.

8. The processing apparatus according to claim 1, wherein the conversion ratio is obtained based on a ratio between the sensitivities.

9. The processing apparatus according to claim 1, wherein the at least one processor further executes instructions to determine, for each divided region, whether a luminance difference between a maximum luminance and a minimum luminance of luminances of the pixel signals whose sensitivities are matched using the conversion ratio is equal to or greater than a predetermined threshold, wherein, in a case where the luminance difference is equal to or greater than the threshold, the synthesis ratio is obtained for the divided region, and in a case where the luminance difference is less than the threshold, the synthesis ration is obtained for each pixel.

10. A capturing apparatus comprising:

a sensor; and a processing apparatus comprising at least one memory configured to store instructions; and at least one processor in communication with the at least one memory and configured to execute the instructions to:

obtain pixel signals of a plurality of images by shooting a subject with different sensitivities by the sensor having a plurality of pixels;

obtain a conversion ratio for converting the pixel signals of the plurality of images into pixel signals with a same sensitivity and a synthesis ratio for synthesizing the pixel signals of the plurality of images with the same sensitivity for each pixel; and perform dynamic range expansion synthesis for each pixel using the pixel signals of the plurality of images using the conversion ratio and the synthesis ratio, wherein the synthesis ratio is obtained for each divided region obtained by dividing the plurality of pixels.

11. The capturing apparatus according to claim 10, wherein the sensitivity is controlled by changing at least one of a charge accumulation period, gain value, transmittance of a filter that passes an incoming light, of the sensor.

12. A method comprising:

obtaining pixel signals of a plurality of images by shooting a subject with different sensitivities by a sensor having a plurality of pixels;

obtaining a conversion ratio for converting the pixel signals of the plurality of images into pixel signals with a same sensitivity and a synthesis ratio for synthesizing the pixel signals of the plurality of images with the same sensitivity for each pixel; and perform dynamic range expansion synthesis for each pixel using the pixel signals of the plurality of images using the conversion ratio and the synthesis ratio, wherein the synthesis ratio is obtained for each divided region obtained by dividing the plurality of pixels.

13. The method according to claim 12, wherein the divided region is a region corresponding to a repetition unit of an arrangement of color filters that covers the sensor.

14. The method according to claim 12, wherein the synthesis ratio is obtained based on a maximum luminance of luminances of the pixel signals of the plurality of images for each divided region.

15. The method according to claim 12, further comprising:

determine, for each divided region, whether a luminance difference between a maximum luminance and a minimum luminance of luminances of the pixel signals whose sensitivities are matched using the conversion ratio is equal to or greater than a predetermined threshold, wherein, in a case where the luminance difference is equal to or greater than the threshold, the synthesis ratio is obtained for the divided region, and in a case where the luminance difference is less than the threshold, the synthesis ration is obtained for each pixel.

16. A method comprising:

obtaining pixel signals of a plurality of images by shooting a subject with different sensitivities by a sensor having a plurality of pixels;

obtaining a conversion ratio for converting the pixel signals of the plurality of images into pixel signals with a same sensitivity;

determining, for each divided region, whether a luminance difference between a maximum luminance and a minimum luminance of luminances of the pixel signals whose sensitivities are matched using the conversion ratio is equal to or greater than a predetermined threshold, obtaining a synthesis ratio for synthesizing the pixel signals of the plurality of images with the same sensitivity for each pixel; and perform dynamic range expansion synthesis for each pixel using the pixel signals of the plurality of images using the conversion ratio and the synthesis ratio, wherein, in a case where the luminance difference is equal to or greater than the threshold, the synthesis ratio is obtained for the divided region, and in a case where the luminance difference is less than the threshold, the synthesis ration is obtained for each pixel.

17. A non-transitory computer-readable storage medium, the storage medium storing a program that is executable by the computer, wherein the program includes program code for causing the computer to obtain pixel signals of a plurality of images by shooting a subject with different sensitivities by a sensor having a plurality of pixels;

obtain a conversion ratio for converting the pixel signals of the plurality of images into pixel signals with a same sensitivity and a synthesis ratio for synthesizing the pixel signals of the plurality of images with the same sensitivity for each pixel; and perform dynamic range expansion synthesis for each pixel using the pixel signals of the plurality of images using the conversion ratio and the synthesis ratio, wherein the synthesis ratio is obtained for each divided region obtained by dividing the plurality of pixels.

18. The non-transitory computer-readable storage medium according to claim 17, wherein the divided region is a region corresponding to a repetition unit of an arrangement of color filters that covers the sensor.

19. The non-transitory computer-readable storage medium according to claim 17, wherein the synthesis ratio is obtained based on a maximum luminance of luminances of the pixel signals of the plurality of images for each divided region.

20. The non-transitory computer-readable storage medium according to claim 17, further comprising:

determining, for each divided region, whether a luminance difference between a maximum luminance and a minimum luminance of luminances of the pixel signals whose sensitivities are matched using the conversion ratio is equal to or greater than a predetermined threshold, wherein, in a case where the luminance difference is equal to or greater than the threshold, the synthesis ratio is obtained for the divided region, and in a case where the luminance difference is less than the threshold, the synthesis ration is obtained for each pixel.

* * * * *